United States Patent
Nagashima et al.

(10) Patent No.: US 8,123,367 B2
(45) Date of Patent: Feb. 28, 2012

(54) IMAGE DISPLAY APPARATUS AND METHOD FOR DISPLAYING IMAGE USING LASER LIGHT EMISSION CONTROL

(75) Inventors: Kenji Nagashima, Daito (JP); Atsuhiko Chikaoka, Daito (JP); Seiji Takemoto, Daito (JP); Hiroki Matsubara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 481 days.

(21) Appl. No.: 12/269,524

(22) Filed: Nov. 12, 2008

(65) Prior Publication Data

US 2009/0122275 A1    May 14, 2009

(30) Foreign Application Priority Data

Nov. 14, 2007   (JP) .................. 2007-295734

(51) Int. Cl.
*G03B 21/28* (2006.01)
*G03B 21/20* (2006.01)

(52) U.S. Cl. .......................... 353/98; 353/85
(58) Field of Classification Search .............. 353/85, 353/98
See application file for complete search history.

(56) References Cited

U.S. PATENT DOCUMENTS 4,101,194 A * 7/1978 Miyazaki et al. ............. 349/1
(Continued)

FOREIGN PATENT DOCUMENTS

EP    1513008    3/2005
(Continued)

OTHER PUBLICATIONS

European Search Report for related application No. 08019681.9, dated Dec. 21, 2010, 7 pages.

(Continued)

*Primary Examiner* — Thanh X Luu
(74) *Attorney, Agent, or Firm* — Osha Liang LLP

(57) ABSTRACT

A projector that can prevent laser light from entering eyes is provided. A process that controls the projector includes the steps of detecting turning-on of power to the projector; detecting an input for adjusting the reflection direction of a two-axis galvanometer mirror; sending an instruction to reduce output from respective lasers, to an FPGA; setting signal values of the lasers respectively controlled by laser control circuits, to small values; determining whether a certain period of time has elapsed since an operation input is no longer performed on an operation panel; standing by the process for a certain period of time when the certain period of time has not elapsed since an operation input is no longer performed; and returning the signal values to a normal level when the certain period of time has elapsed since an operation input is no longer performed.

5 Claims, 17 Drawing Sheets

U.S. PATENT DOCUMENTS

| | | |
|---|---|---|
| 2005/0175048 A1 | 8/2005 | Stern et al. |
| 2006/0244925 A1 | 11/2006 | Seki et al. |
| 2006/0279664 A1 | 12/2006 | Tan et al. |
| 2007/0195294 A1 | 8/2007 | Willey et al. |
| 2008/0111976 A1 | 5/2008 | Takito et al. |
| 2009/0147224 A1 | 6/2009 | Kurozuka et al. |

FOREIGN PATENT DOCUMENTS

| | | |
|---|---|---|
| JP | 2004-101622 | 4/2004 |
| JP | 2004-341210 | 12/2004 |
| JP | 2006-133401 | 5/2006 |
| JP | 2006-276446 | 10/2006 |
| WO | 2006/098402 | 9/2006 |
| WO | 2007/034875 A1 | 3/2007 |

OTHER PUBLICATIONS

Patent Abstracts of Japan for Japanese Publication No. 2004-341210, Publication date Dec. 2, 2004 (1 page).

Patent Abstracts of Japan for Japanese Publication No. 2004-101622, Publication date Apr. 2, 2004 (1 page).

Patent Abstracts of Japan for Japanese Publication No. 2006-276446, Publication date Oct. 12, 2006 (1 page).

Patent Abstracts of Japan for Japanese Publication No. 2006-133401, Publication date May 25, 2006 (1 page).

Search Report for European Application No. 08019681.9 mailed Apr. 4, 2011 (19 pages).

* cited by examiner

IMAGE DISPLAY APPARATUS AND METHOD FOR DISPLAYING IMAGE USING LASER LIGHT EMISSION CONTROL

BACKGROUND OF THE INVENTION

1. Field of the Invention

The present invention relates to an apparatus and a method for displaying an image, and more particularly, to an image display apparatus and method for projecting an image by laser light.

2. Description of the Background Art

As a projector that is one of image display apparatuses, a project is known. For example, Japanese Patent Laying-Open No. 2006-276446 discloses a projection apparatus that can suppress exiting of light from a projecting unit when the position of the projecting unit is not at a target position. Japanese Patent Laying-Open No. 2006-133401 discloses a projector in which even when an image is radiated on the human body damage caused thereby can be suppressed to a minimum. Japanese Patent Laying-Open No. 2004-101622 discloses a projector that can suppress discomfort caused when projected light comes within sight of a person. Furthermore, Japanese Patent Laying-Open No. 2004-341210 discloses a projector that can reduce laser light exposure.

When a projector using a laser as a light source is used, there is a possibility that laser light may enter the eyes of a person. For example, according to a technique disclosed in Japanese Patent Laying-Open No. 2004-341210, while the laser light is outputted, the laser light may come within sight of a person.

SUMMARY OF THE INVENTION

The present invention is made to solve problems such as those described above, and therefore, an object of the present invention is to provide an image display apparatus and method that can prevent the laser light from entering the eyes of a person.

An image display apparatus according to one aspect of the present invention includes: a first light-emitting unit configured to emit a first laser light; a second light-emitting unit configured to emit a second laser light having a wavelength different from a wavelength of the first laser light; a reflecting unit disposed to reflect the first laser light and the second laser light; an input unit configured to accept an input performed on the image display apparatus; an adjusting unit configured to adjust, based on the input, a projection direction of lights reflected by the reflecting unit or a size or shape of a projection surface; and a control unit configured to control amounts of light emission from the first light-emitting unit and the second light-emitting unit, based on an operation for adjusting the projection direction of the light.

An image display apparatus according to another aspect of the present invention includes: a light-emitting unit configured to radiate laser light; a photodetector configured to detect light; a storage unit configured to store a first amount of the light detected by the photodetector when the light-emitting unit does not radiate the laser light at a predetermined certain amount of the light, a second amount of the light detected by the photodetector when the light-emitting unit radiates the laser light, and a third amount of the light detected by the photodetector when the light-emitting unit radiates the laser light to project an image; and a control unit configured to control an operation of the image display apparatus. The control unit is configured to: calculate a fourth amount of the light at which light reception is assumed by projecting the image, based on image data based on which the image is formed, the first amount of the light, and the second amount of the light; and suppress an output of the laser light when the difference between the third amount of the light and the fourth amount of the light is greater than or equal to a preset value.

An image display apparatus according to still another aspect of the present invention includes: a light-emitting unit configured to radiate laser light; a detecting unit configured to detect movement of the image display apparatus; and a control unit configured to control radiation by the light-emitting unit. The control unit is configured to: cause, after start-up of the image display apparatus, the light-emitting unit to output the laser light at a predetermined first level; cause the light-emitting unit to continue the output at the first level for a predetermined period of time after the start-up of the image display apparatus or while the movement of the image display apparatus is detected based on an output from the detecting unit; and raise the output by the light-emitting unit to a preset second level when the predetermined period of time has elapsed after the movement of the image display apparatus is no longer detected.

A method for displaying an image according to yet another aspect of the present invention includes the steps of: emitting a first laser light and a second laser light having a wavelength different from a wavelength of the first laser light; adjusting a projection direction of the reflected light of the first laser light and the second laser light or a size or shape of a projection surface; and controlling amounts of the light emission of a light source of the first laser light and a light source of the second laser light based on an operation for adjusting the projection direction of the light.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a timing chart showing a change in the amount of light after power to projector 100 is turned on.

DESCRIPTION OF THE PREFERRED EMBODIMENTS

Figure 1:
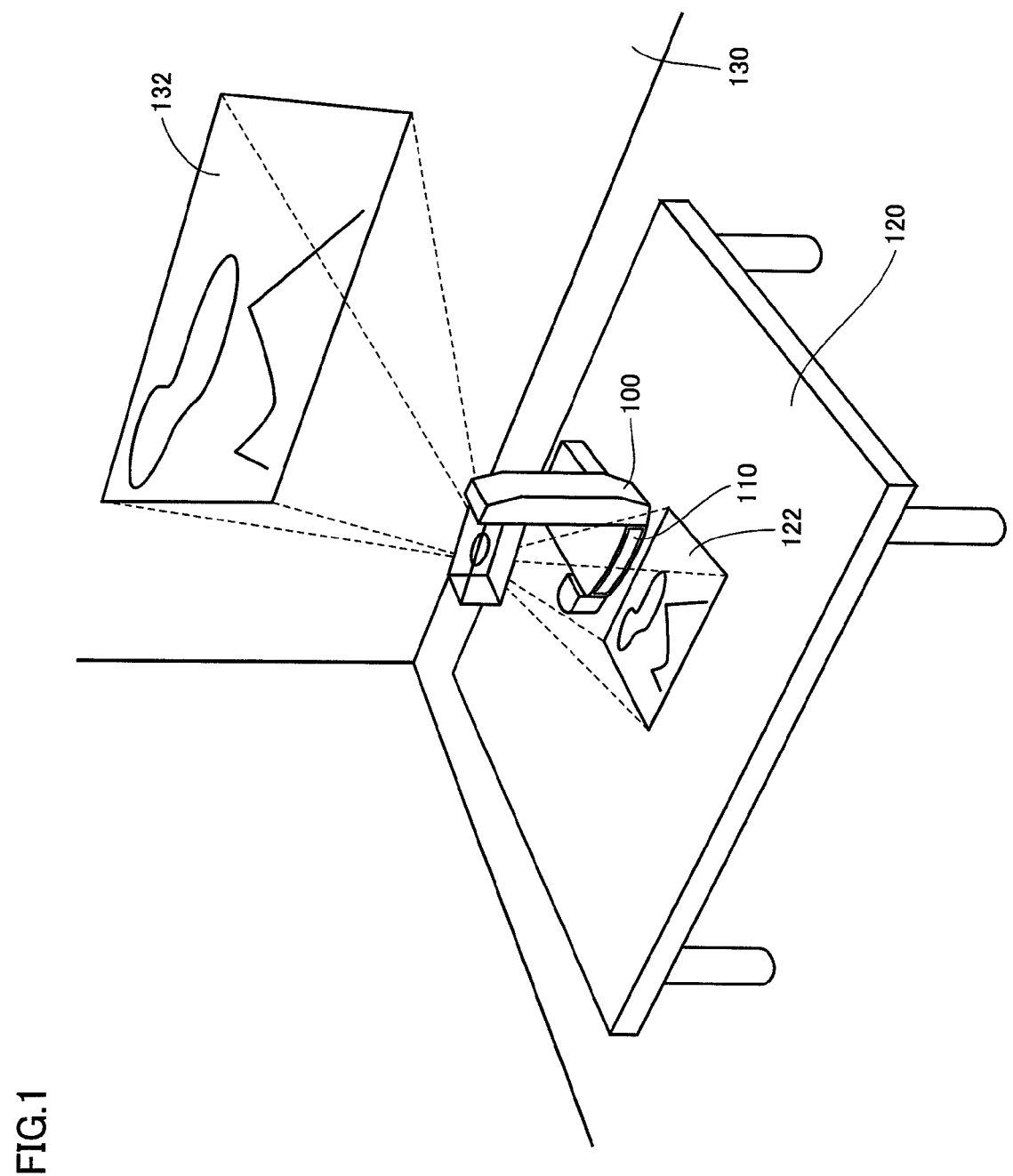
FIG. 1 is a diagram showing a state in which a projector 100 which is one mode of an image display apparatus according to the present invention is set up.

With reference to the drawings, embodiments of the present invention will be described below. In the following description, the same elements are denoted by the same reference numerals. The names and functions of such elements are also the same. Thus, detailed description thereof is not repeated.

First Embodiment

[Use Mode]

With reference to FIG. 1, a use mode of an image display apparatus according to the present invention will be described. FIG. 1 is a diagram showing a state in which a projector 100 which is one mode of an image display apparatus is set up. Projector 100 is of a portable size, for example, but may be a stationary projector.

Projector 100 is disposed on a table 120. Projector 100 projects an image 132 for presentation onto a wall 130 serving as a screen. Also, projector 100 projects an image 122 onto a top surface of table 120 so that a user of projector 100 can see image 122. The size of image 122 is normally smaller than that of image 132. In one aspect, projector 100 includes a CCD (Charge Coupled Device) sensor 110. Note that CCD sensor 110 is not an essential configuration in projector 100 according to the present embodiment.

[Functional Configuration]

Figure 2:
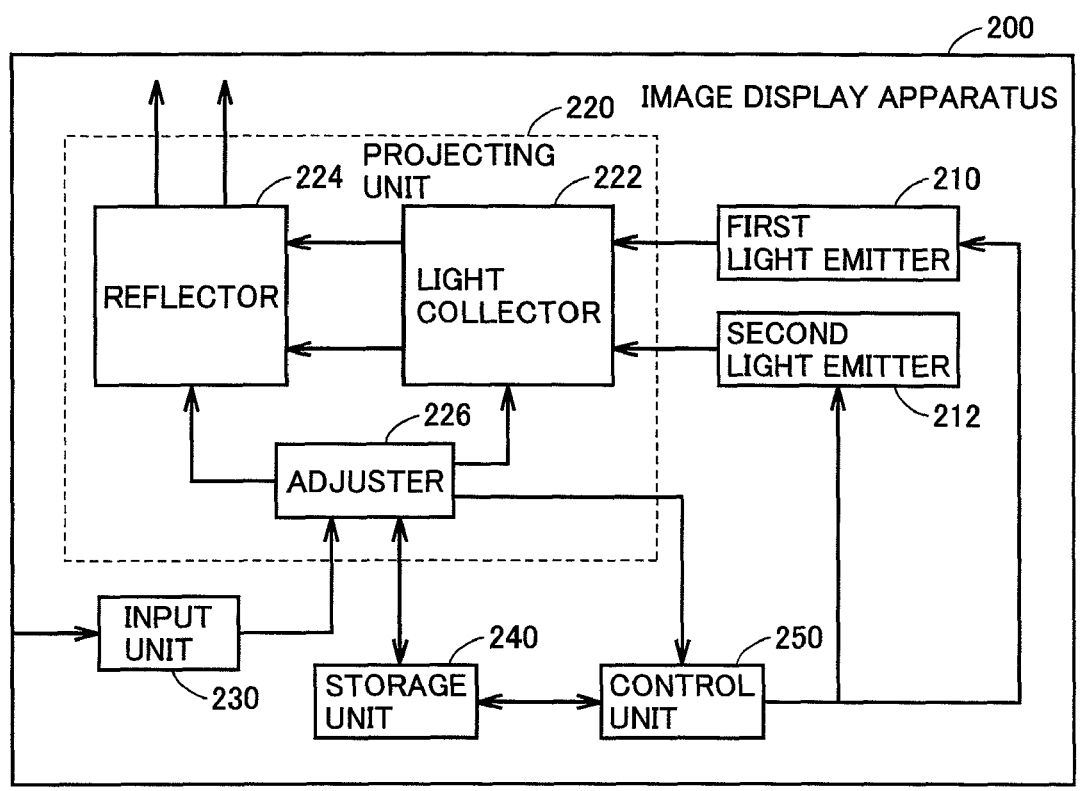
FIG. 2 is a block diagram showing configurations of functions of an image display apparatus 200 according to the present invention.

With reference to FIG. 2, a configuration of an image display apparatus 200 according to the present invention will be described. FIG. 2 is a block diagram showing configurations of functions of image display apparatus 200. Image display apparatus 200 includes a first light emitter 210, a second light emitter 212, a projecting unit 220, an input unit 230, a storage unit 240, and a control unit 250. Projecting unit 220 includes a light collector 222, a reflector 224, and an adjuster 226.

First light emitter 210 is configured to emit a first laser light having a certain wavelength. Second light emitter 212 is configured to emit a second laser light having a wavelength different from the certain wavelength. The laser light emitted from first light emitter 210 and second light emitter 212 enters light collector 222. Light collector 222 causes the laser lights to exit to reflector 224 in a certain direction.

Reflector 224 is configured to reflect the first laser light and the second laser light. More specifically, reflector 224 reflects the first laser light and the second laser light toward an exit aperture (not shown) of image display apparatus 200. In one aspect, reflector 224 includes a galvanometer mirror. Preferably, the galvanometer mirror can adjust two axes.

Input unit 230 is configured to accept an input of an operation performed on image display apparatus 200. When input unit 230 accepts an input of an operation, input unit 230 sends out a signal according to the input to adjuster 226. In one aspect, input unit 230 is implemented as buttons, a touch panel, or other switches.

Adjuster 226 is configured to adjust the projection direction of the light reflected by reflector 224 or the size or shape of a projection surface, based on the input sent from input unit 230. Note that all of the above-described items (projection direction, size, and shape) are not always included as adjustment targets, and any of the items may selectively serve as an adjustment target. In one aspect, adjuster 226 functions as an actuator configured to drive reflector 224. In one aspect, adjuster 226 includes a lens, a beam splitter that splits a first laser light and a second laser light transmitted through the lens, a hologram element disposed to receive laser light obtained through the split by the beam splitter, and a detector configured to detect light transmitted through the hologram element. At this time, control unit 250 suppresses the amount of the light emission of the laser light outputted from first light emitter 210 and second light emitter 212, based on the drive of reflector 224.

In another aspect, adjuster 226 is configured to make an optical path of a first laser light substantially parallel to an optical path of a second laser light. Control unit 250 suppresses the output levels of the first laser light and the second laser light based on the drive of adjuster 226 such as that described above.

Storage unit 240 stores parameters (e.g., data for specifying the angle of reflector 224) that are used when adjuster 226 drives. In one aspect, storage unit 240 is configured as a non-volatile memory.

Control unit 250 is configured to control the amounts of light emission from first light emitter 210 and second light emitter 212, based on an operation for adjusting the projection direction of the light. Control unit 250 is implemented as a processor or other arithmetic and control unit.

In one aspect, control unit 250 suppresses the amounts of light emission emitted from first light emitter 210 and second light emitter 212 to a predetermined amount of light emission or less.

In one aspect, when control unit 250 detects an operation for adjusting the projection direction of lights, control unit 250 suppresses the amounts of light emission from first light emitter 210 and second light emitter 212 for a predetermined period of time.

Preferably, when control unit 250 detects completion of an operation for adjusting the projection direction of the light or the size or shape of a projection surface, control unit 250 controls first light emitter 210 and second light emitter 212 such that the amounts of light emission from first light emitter 210 and second light emitter 212 become those obtained before performing the adjustment operation.

[Hardware Configuration]

Figure 3:
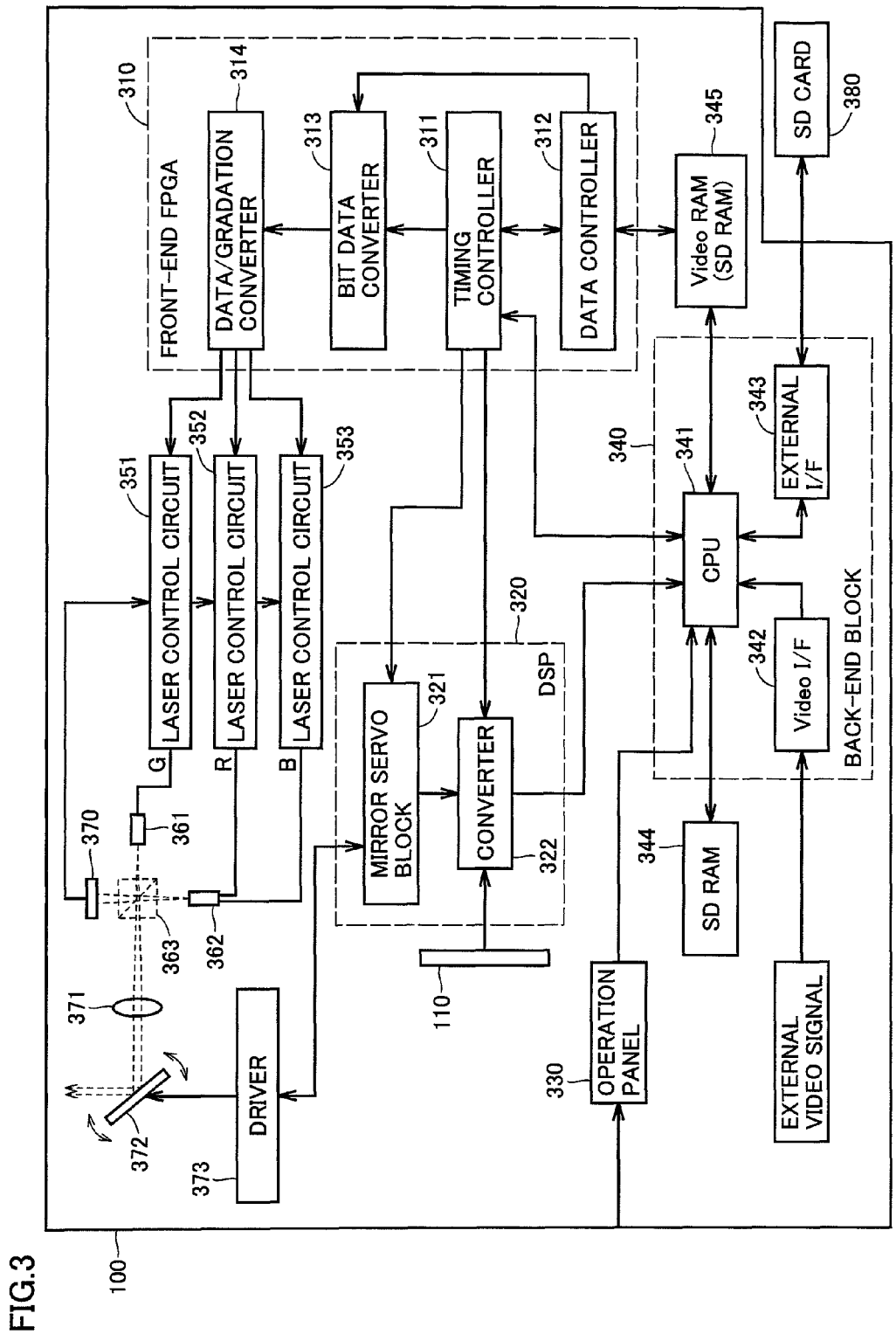
FIG. 3 is a block diagram showing a hardware configuration of projector 100.

Next, with reference to FIG. 3, a specific configuration of projector 100 which is an example of image display apparatus 200 will be described. FIG. 3 is a block diagram showing a hardware configuration of projector 100.

Projector 100 includes a front-end FPGA (Field Programmable Gate Array) 310, a digital signal processor 320, an operation panel 330, a back-end block 340, an SDRAM (Synchronous Dynamic Random Access Memory) 344, a video RAM 345, laser control circuits 351, 352, and 353, a green LD (Laser Diode) 361, a red/blue LD 362, a polarization beam splitter 363, a detector 370, a galvanometer mirror 372, and a driver 373. Driver 373 includes, for example, a driver motor, a coil, etc.

Front-end FPGA 310 includes a data/gradation converter 314, a timing controller 311, a data controller 312, and a bit data converter 313. Digital signal processor 320 includes a mirror servo block 321 and a converter 322. Although red/blue LD 362 is such that a red LD and a blue LD are integrally formed, red/blue LD 362 may be separately formed.

Operation panel 330 is provided on a front surface or side surface of a casing of projector 100. Operation panel 330 includes, for example, a display apparatus (not shown) that displays operation content; and switches (e.g., plus/minus buttons) that accept an operation input performed on projector 100. When operation panel 330 accepts an operation, operation panel 330 sends out a signal according to the operation to a CPU 341 of back-end block 340.

An image signal provided from an external source of projector 100 is inputted to a video interface 342. In one aspect, projector 100 includes an external interface 343. External interface 343 accepts, for example, a load of an SD card 380. External interface 343 reads data from SD card 380 and the data is stored in SDRAM 344 or video RAM 345.

CPU 341 controls projection of video obtained based on a signal inputted to projector 100 through video interface 342 or external interface 343, based on an operation input provided to operation panel 330. More specifically, by CPU 341 performing mutual communication with timing controller 311 of front-end FPGA 310, CPU 341 controls display of video obtained based on image data that is temporarily stored in video RAM 345.

In front-end FPGA 310, timing controller 311 reads data stored in video RAM 345 through data controller 312 based on an instruction sent from CPU 341. Data controller 312 sends out the read data to bit data converter 313. Bit data converter 313 sends out the data to data/gradation converter 314 based on an instruction from timing controller 311. Bit data converter 313 converts image data provided from an external source, into a format that conforms to a format for projection by the laser light emission.

Data/gradation converter 314 converts the data outputted from bit data converter 313, into color gradation for displaying the data as three colors of G, R, and B and sends out the converted data to laser control circuits 351, 352, and 353.

On the other hand, timing controller 311 controls drive of two-axis galvanometer mirror 372 with digital signal processor 320. More specifically, timing controller 311 sends out an instruction to mirror servo block 321 to drive driver 373. In response to the instruction, driver 373 changes the position and tilt of two-axis galvanometer mirror 372.

Converter 322 performs A/D (Analog to Digital) conversion of a signal sent from CCD sensor 110, based on a signal sent from timing controller 311 and sends out digital data obtained after the conversion to CPU 341. For example, when CCD sensor 110 shoots a subject present within a shootable range thereof, an image signal of the subject is sent to CPU 341. When a setting for displaying an image shot by CCD sensor 110 is valid, CPU 341 sends an instruction to timing controller 311 to display an image based on data corresponding to the image signal.

Also, converter 322 transmits a signal sent from mirror servo block 321, to CPU 341. For example, converter 322 generates a signal including an instruction provided to driver 373 and a state of driver 373 and sends out the signal to CPU 341.

Laser control circuit 351 controls drive of green LD 361 based on a signal sent from data/gradation converter 314.

Similarly, laser control circuits 352 and 353 respectively control the red LD and the blue LD according to an instruction sent from data/gradation converter 314. Green LD 361 and red/blue LD 362 emit laser light according to their respective control.

Polarization beam splitter 363 is disposed on an optical path of a laser light emitted from green LD 361. Polarization beam splitter 363 transmits green LD 361. Also, polarization beam splitter 363 partially transmits and partially reflects red/blue LD 362. Detector 370 is disposed on optical paths of the laser light emitted from red/blue LD 362. The laser light transmitted through polarization beam splitter 363 is collected in a certain area through a lens 371 and reflected by two-axis galvanometer mirror 372. The reflected light is projected outside projector 100. At this time, two-axis galvanometer mirror 372 changes the tilt thereof by drive of driver 373.

[Control Structure]

Figure 4:
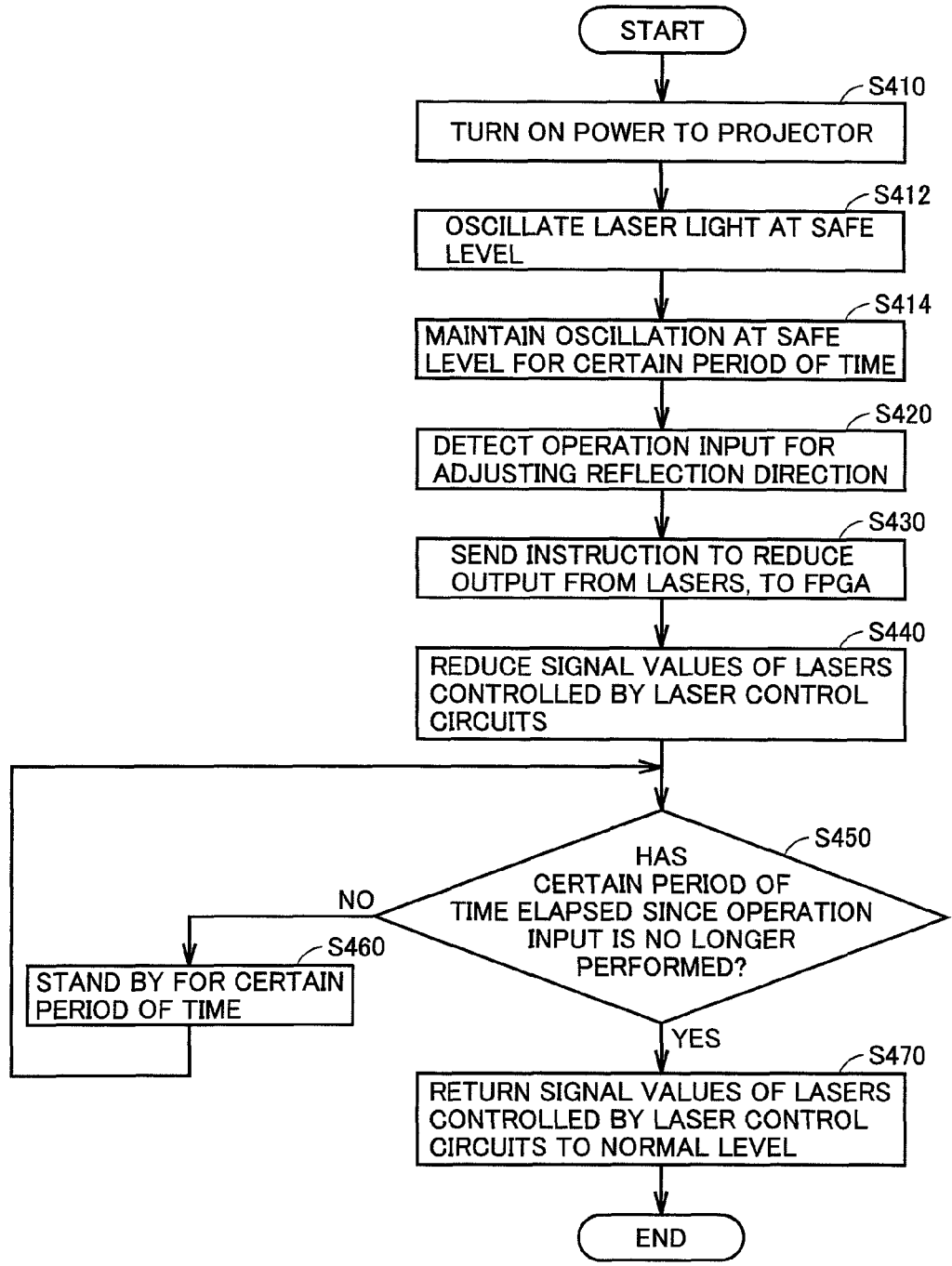
FIG. 4 is a flowchart showing a part of an operation performed by a CPU 341 included in projector 100.

Next, with reference to FIG. 4, a control structure of projector 100 according to the present embodiment will be described. FIG. 4 is a flowchart showing a part of an operation performed by CPU 341 included in projector 100.

In step S410, CPU 341 detects that power to projector 100 is turned on. In step S412, CPU 341 first oscillates lasers at a safe level. In step S414, CPU 341 maintains the oscillation at the safe level for a certain period of time and alerts a user of projector 100 to prevent laser lights from unexpectedly entering the eyes when a switch is turned on. Alternatively, CPU 341 may gradually increase laser oscillation output to a steady-state level in a certain period of time.

Then, in step S420, CPU 341 detects, based on a signal sent from operation panel 330, that an input for adjusting the reflection direction, etc., of two-axis galvanometer mirror 372 has been performed. At this time, CPU 341 does not need to wait for the certain period of time in step S414 to elapse and even during the process in step S414, CPU 341 can move to the process in step S420.

In step S430, CPU 341 sends an instruction to reduce output from the lasers, to timing controller 311 of FPGA 310. In step S440, CPU 341 sends an instruction to timing controller 311 to set signal values of the lasers respectively controlled by laser control circuits 351, 352, and 353, to small values.

In step S450, CPU 341 determines whether a certain period of time has elapsed since an operation input is no longer performed on operation panel 330. If CPU 341 determines that a certain period of time has elapsed since an operation input is no longer performed (YES in step S450), then CPU 341 switches control to step S470. If not (NO in step S450), then CPU 341 switches control to step S460.

In step S460, CPU 341 stands by the process for a certain period of time. For example, CPU 341 suspends the process for a period of time that is pre-specified for standby.

In step S470, CPU 341 returns the signal values of green LD 361 and red/blue LD 362, which are controlled by laser control circuits 351, 352, and 353, to a normal level. More specifically, CPU 341 sends out an instruction to return the signal values to the normal level, to timing controller 311. Timing controller 311 transmits the instruction to data/gradation converter 314 through bit data converter 313. When data/gradation converter 314 provides signals based on the instruction respectively to laser control circuits 351, 352, and 353, the signal values are returned to the normal level. Thereafter, the laser light emitted from green LD 361 and the laser light emitted from red/blue LD 362 have normal output levels.

[Change in the Amount of Light]

Figure 5:
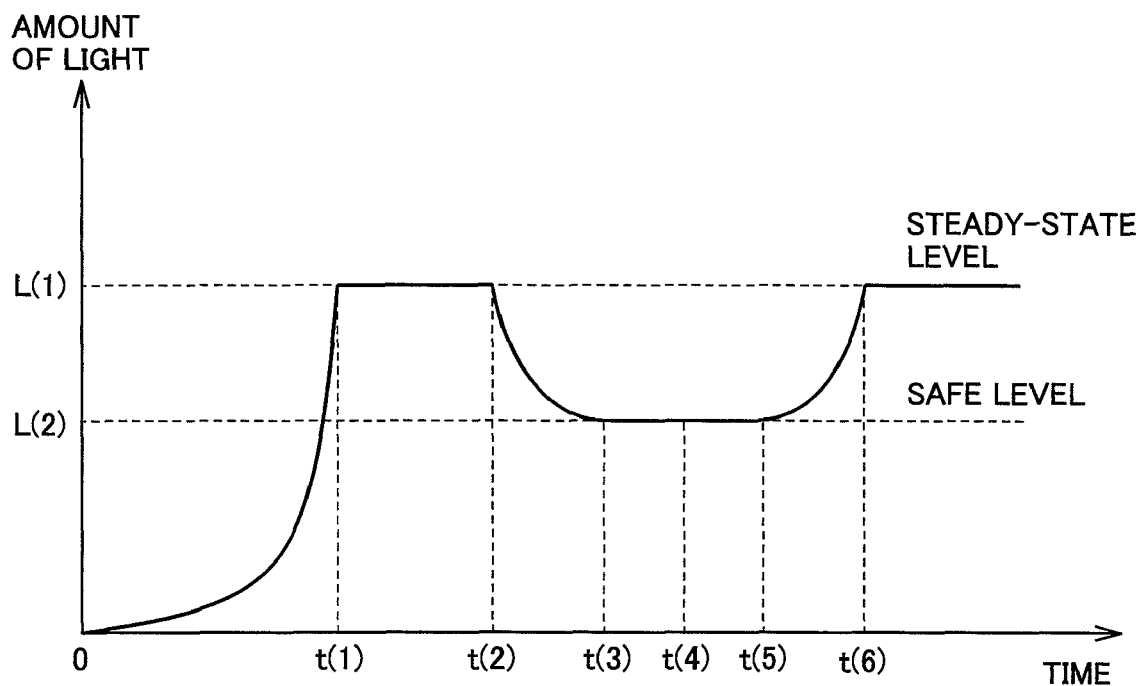

With reference to FIG. 5, a change in the amount of the light when projector 100 according to the present embodiment is used will be described. FIG. 5 is a timing chart showing a change in the amount of the light after power to projector 100 is turned on.

At time 0, the switch of projector 100 is set to ON. When CPU 341 detects the ON, CPU 341 starts a normal light emission operation. More specifically, CPU 341 provides a light emission instruction to timing controller 311 such that the amount of the light obtains a preset steady-state level L(1). Based on the light emission instruction, timing controller 311 provides a signal for driving laser control circuits 351, 352, and 353, through bit data converter 313 and data/gradation converter 314. When green LD 361 and red/blue LD 362 emit laser lights of the respective colors based on control of laser control circuits 351, 352, and 353, the amount of the light to be measured gradually increases. The amount of light reaches steady-state level L(1) at time t(1). The steady-state state continues from time t(1) to t(2).

At time t(2), a user of projector 100 operates operation panel 330 to attempt to adjust the reflection direction of two-axis galvanometer mirror 372. Based on a signal from operation panel 330, CPU 341 detects the operation (step S420). In response to the detection, CPU 341 sends an instruction to reduce output from the lasers, to front-end FPGA 310 (step S430).

Laser control circuits 351, 352, and 353 change the instruction provided to green LD 361 and red/blue LD 362 and reduce the power of the laser light to be outputted. As a result, the amount of the light detected gradually decreases from time t(2) and at time t(3) the amount of the light is reduced to an amount of the light L(2) that is a safe level. The state of the amount of the light L(2) continues for a while. The state of the amount of the light L(2) continues, for example, at least from time t(3) to time t(4).

Thereafter, when a preset safe time has elapsed from time t(4) and then time t(5) is reached, CPU 341 provides an instruction to bring the laser output to a steady-state level, to front-end FPGA 310. Laser control circuits 351, 352, and 353 increase output to green LD 361 and red/blue LD 362 and thereby raise laser light output. As a result, the amount of the light detected gradually increases. At time t(6), the amount of the light reaches the amount of the light L(1) that is the steady-state level. Thereafter, projector 100 can project video at a normal amount of light.

In the above-described manner, according to projector 100 according to the first embodiment of the present invention, an operation for adjusting the radiation direction of the laser light is detected. When the operation is, for example, an operation for adjusting the tilt of two-axis galvanometer mirror 372, the operation may also include other operations for adjusting an internal mechanism. When projector 100 detects the operation, projector 100 reduces the output levels of laser lights to a safe level. By doing so, even when a user performs an operation while projector 100 outputs laser lights, safety of the user can be maintained.

<Variant>

A variant of the embodiment of the present invention will be described below. A projector 600 according to the present variant is different from projector 100 according to the foregoing embodiment in that projector 600 has a function of adjusting the amount of the light while adjusting the parallelism of the laser light of respective colors.

[Hardware Configuration]

Figure 6:
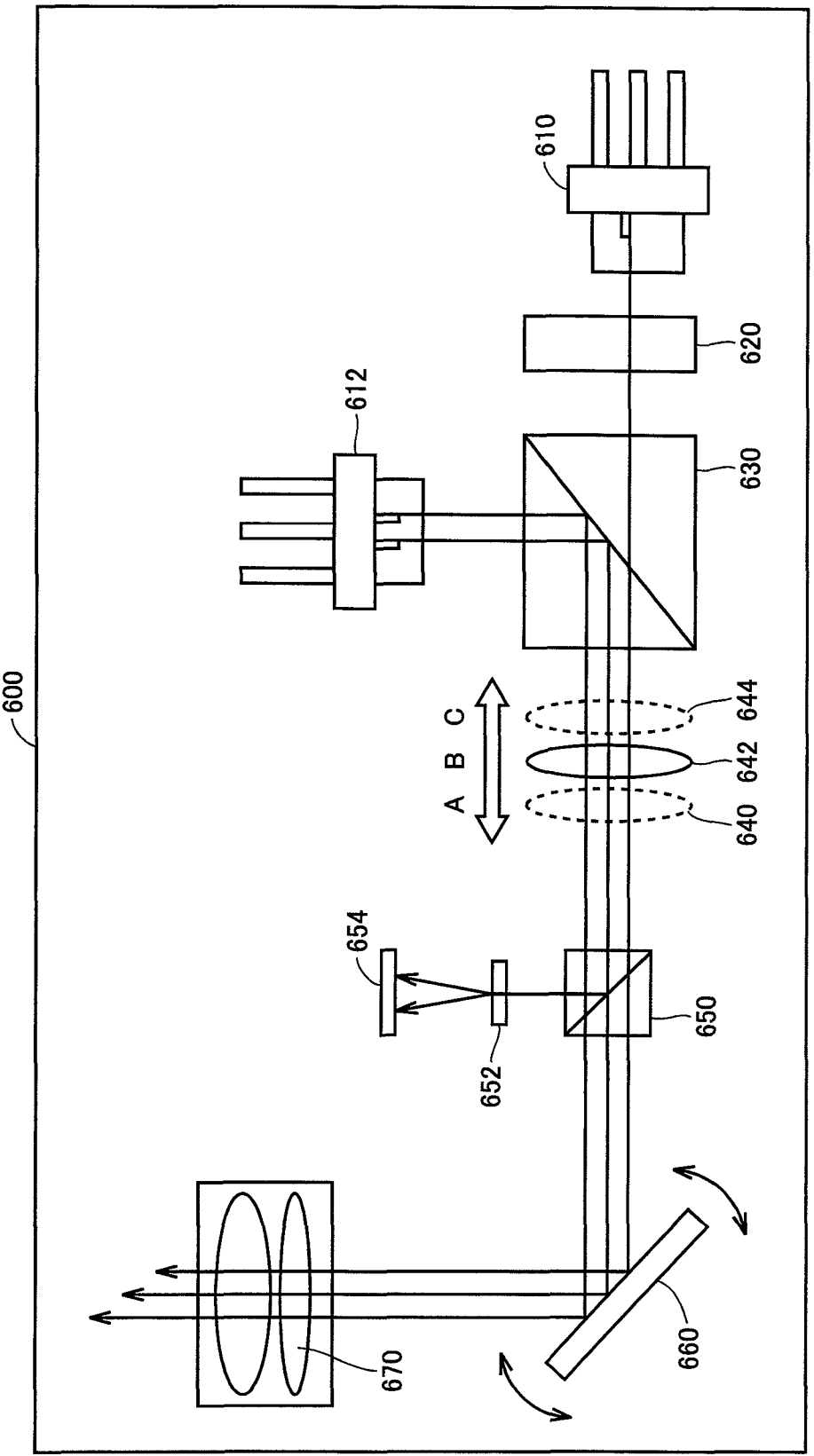
FIG. 6 is a block diagram showing a hardware configuration of a projector 600 according to a variant of the first embodiment of the present invention.

With reference to FIG. 6, a specific configuration of projector 600 according to the present variant will be described. FIG. 6 is a block diagram showing a hardware configuration of projector 600. Projector 600 includes an infrared laser 610, a two-wavelength laser 612, a second-harmonic generator 620, a polarization beam splitter 630, a collimate lens 642, a beam splitter 650, a hologram element 652, a photodetector 654, a two-axis galvanometer mirror 660, and a projection lens 670. Note that collimate lenses 640 and 644 in FIG. 6 show collimate lens 642 being moved from a position B to a position A or position C for focus adjustment. In the present variant, when projector 600 is in an initial state, the position B corresponds to an initial position of collimate lens 642.

A laser light outputted from infrared laser 610 enters polarization beam splitter 630 through second-harmonic generator 620. On the other hand, when red and blue laser light outputted from two-wavelength laser 612 enter polarization beam splitter 630, the red and blue laser light is reflected by polarization beam splitter 630 so as to be parallel to the laser light emitted from infrared laser 610. Each laser light enters collimate lens 642.

The laser light transmitted through collimate lens 642 enters beam splitter 650. Beam splitter 650 reflects the laser light outputted from two-wavelength laser 612 toward hologram element 652. Hologram element 652 is configured, for example, such that a pattern exhibiting a lens effect is decentered, whereby a convex lens effect occurs with +primary light and a concave lens effect occurs with −primary light and thus light spots are formed at different locations.

The laser light transmitted through hologram element 652 projects spots for detecting parallelism in photodetector 654. Photodetector 654 adjusts the parallelism of the laser light. The adjustment is performed, for example, such that the sizes of the spots (the diameters of circles to be projected, etc.) match each other.

On the other hand, the laser light transmitted through beam splitter 650 is reflected by two-axis galvanometer mirror 660. The reflected light enters projection lens 670.

In such a configuration, the output level of each laser light can be suppressed based on a detection result obtained by photodetector 654. Specifically, a controller (not shown) included in projector 600 detects, based on a signal from photodetector 654, that an operation for adjusting the parallelism of the laser light is performed. The signal is outputted in response to an operation performed on a switch of projector 600. Based on the detection, the controller provides an instruction to reduce the laser light output to a safe level L(2) such as that described in the first embodiment, to infrared laser 610 and two-wavelength laser 612.

As a result, when an adjustment for the parallelism of the laser light is made by a user of projector 600, projector 600 can suppress output of the laser light projected from projection lens 670 and accordingly the safety can be enhanced.

Second Embodiment

Next, a second embodiment of the present invention will be described. An image display apparatus according to the present embodiment is different from the image display apparatus according to the foregoing first embodiment in that the apparatus can suppress output when a person is detected between the apparatus and a projected image.

[External Appearance]

Figure 7:
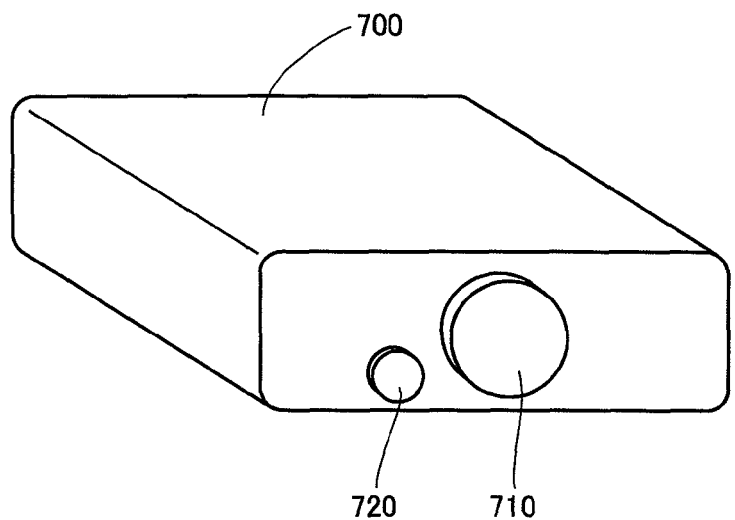
FIG. 7 is a diagram showing an external appearance of a projector 700 according to a second embodiment of the present invention.

With reference to FIG. 7, a configuration of a projector 700 according to the second embodiment of the present invention will be described. FIG. 7 is a diagram showing an external appearance of projector 700. Projector 700 includes a laser exit aperture 710 and a photodetector 720. It is preferable that photodetector 720 be disposed on the same surface as the disposition surface of laser exit aperture 710. On the other hand, it is preferable that photodetector 720 be disposed at a location where the laser light radiated from laser exit aperture 710 is not directly detected.

[Use Mode]

Figure 8:
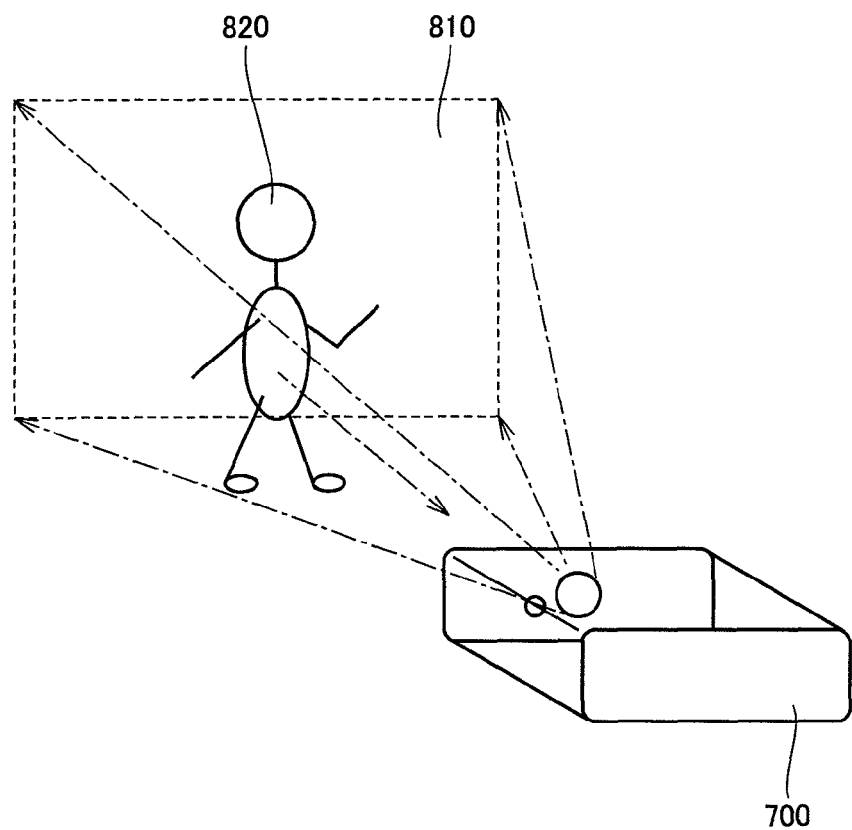
FIG. 8 is a diagram showing a scene where a user is present between projector 700 and an image projected onto a wall.

With reference to FIG. 8, a use mode of projector 700 according to the present embodiment will be described. FIG. 8 is a diagram showing a scene where a user is present between projector 700 and an image projected onto a wall. Projector 700 is projecting an image 810 onto a screen. Normally, it is not desirable that a person be present between projector 700 and image 810 but here it is assumed that a person 820 is present in such an area. In this case, projector 700 detects, by photodetector 720, a change in the amount of the light on a projection surface and suppresses the laser light output according to the change.

[Hardware Configuration]

Figure 9:
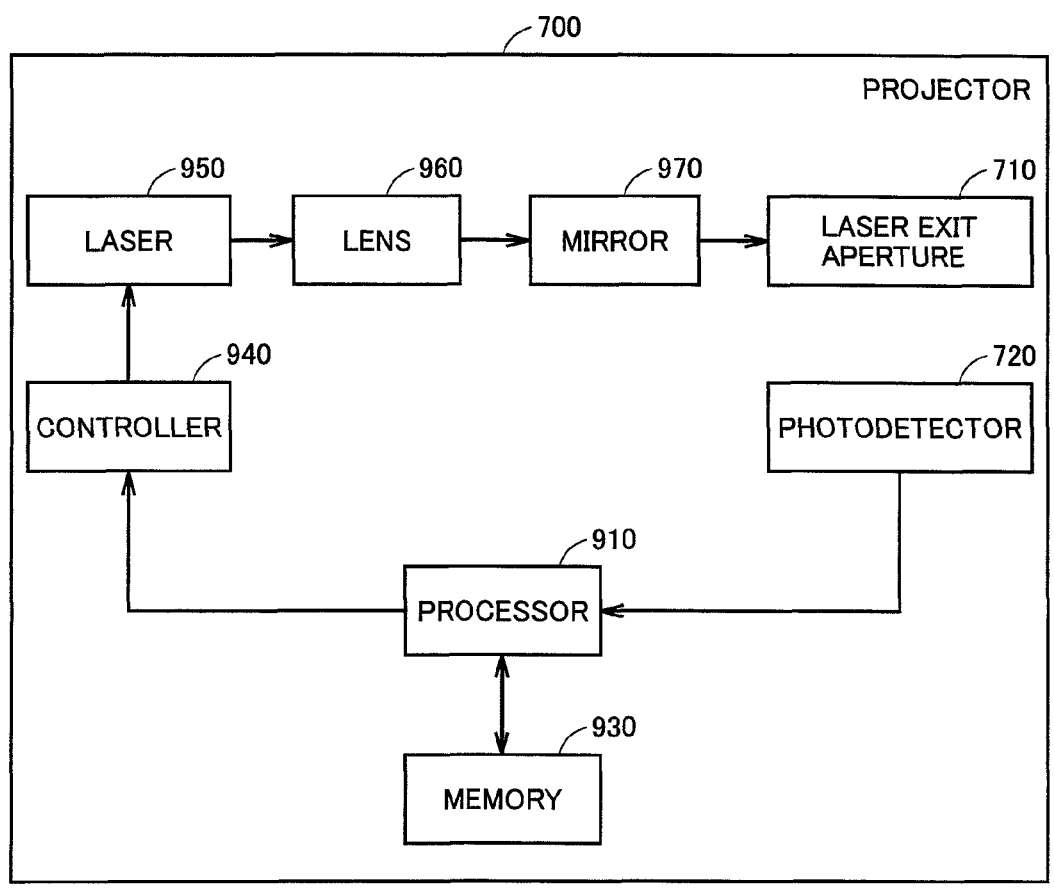
FIG. 9 is a block diagram showing the main hardware configuration of projector 700.

With reference to FIG. 9, a specific configuration of projector 700 according to the second embodiment of the present invention will be described. FIG. 9 is a block diagram showing a main hardware configuration of projector 700.

Projector 700 includes a processor 910, a memory 930, a controller 940, a laser 950, a lens 960, and a mirror 970, in addition to laser exit aperture 710 and photodetector 720. Photodetector 720 detects an amount of the light on a projection surface of projector 700. A result of the detection is sent to processor 910.

Processor 910 controls an operation of projector 700 based on a signal provided from an external source or when a preset condition is satisfied. In one aspect, processor 910 controls the light emission by laser 950, based on a detection result of an amount of the light sent from photodetector 720.

More specifically, processor 910 determines whether an output level change by laser 950 is required, based on a comparison of data that is stored in advance in memory 930 with data representing an amount of the light sent from photodetector 720. For example, when a detected amount of the light is smaller than a first amount of the light that is stored in advance in memory 930 as a setting value, there is a possibility that a person may be present in front of the screen. In this case, processor 910 determines that there is a person on optical path of the laser light and thus provides an instruction to reduce output from laser 950, to controller 940.

Alternatively, there may be a case in which a detected amount of the light is larger than a second amount of the light that is stored in advance in memory 930 as a setting value. In this case, it can be considered that there is a person near the laser exit aperture. In this case, too, processor 910 provides an instruction to reduce output from laser 950, to controller 940.

Controller 940 controls drive of laser 950 based on an instruction sent from processor 910. The levels of drive controlled by controller 940 include, for example, a normal level and a level lower than normal.

Laser 950 outputs the laser light according to a control signal from controller 940. In one aspect, laser 950 includes an infrared laser and two-wavelength lasers of red and blue.

Lens 960 focuses the laser light outputted from laser 950 in a certain direction and output the laser light. The laser light transmitted through lens 960 is reflected by mirror 970 and projected outside projector 700 through laser exit aperture 710.

[Control Structure]

Figure 10:
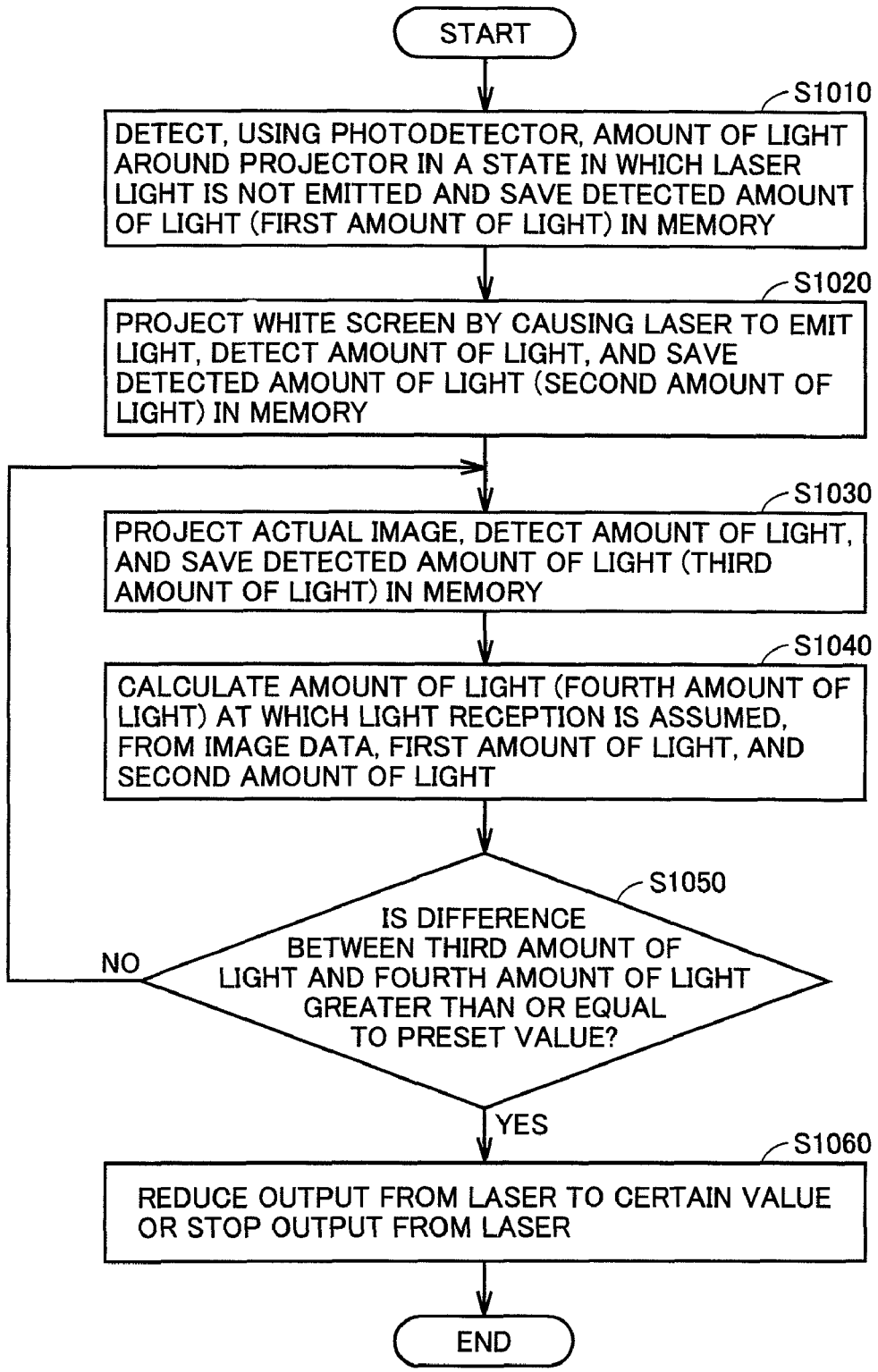
FIG. 10 is a flowchart showing a summary of a process performed by a processor 910 included in projector 700.

Next, with reference to FIG. 10, a control structure of projector 700 will be described. FIG. 10 is a flowchart showing a schematic process performed by processor 910.

In step S1010, processor 910 of projector 700 detects, using photodetector 720, an amount of light around projector 700 in a state in which the laser light is not emitted from laser 950, and saves the detected amount of the light (first amount of light) in memory 930.

In step S1020, processor 910 causes laser 950 to emit the laser light to project a white screen, detects an amount of the light using photodetector 720, and saves the detected amount of the light (hereinafter, the second amount of light) in memory 930.

In step S1030, processor 910 projects an actual image, detects an amount of the light obtained at that time using photodetector 720, and saves the detected amount of the light (hereinafter, the third amount of light) in memory 930.

In step S1040, processor 910 calculates an amount of the light (hereinafter, the fourth amount of light) at which light reception is assumed, from image data for displaying the image, the first amount of the light, and the second amount of the light.

In step S1050, processor 910 determines whether the difference between the third amount of the light and the fourth amount of the light is greater than or equal to a preset value. If processor 910 determines that the difference between the third amount of the light and the fourth amount of the light is greater than or equal to a preset value (YES in step S1050), then processor 910 switches control to step S1060. If not (NO in step S1050), then processor 910 returns control to step S1030.

In step S1060, processor 910 sends out an instruction to reduce the laser light output from laser 950 to a preset certain value, to controller 940. Alternatively, processor 910 instructs controller 940 to stop the output from laser 950. Thereafter, laser 950 emits the light in a mode in which the output is reduced to the certain value, or stops laser light output itself.

[Calculation of an Estimated Amount of Light]

Figure 11:
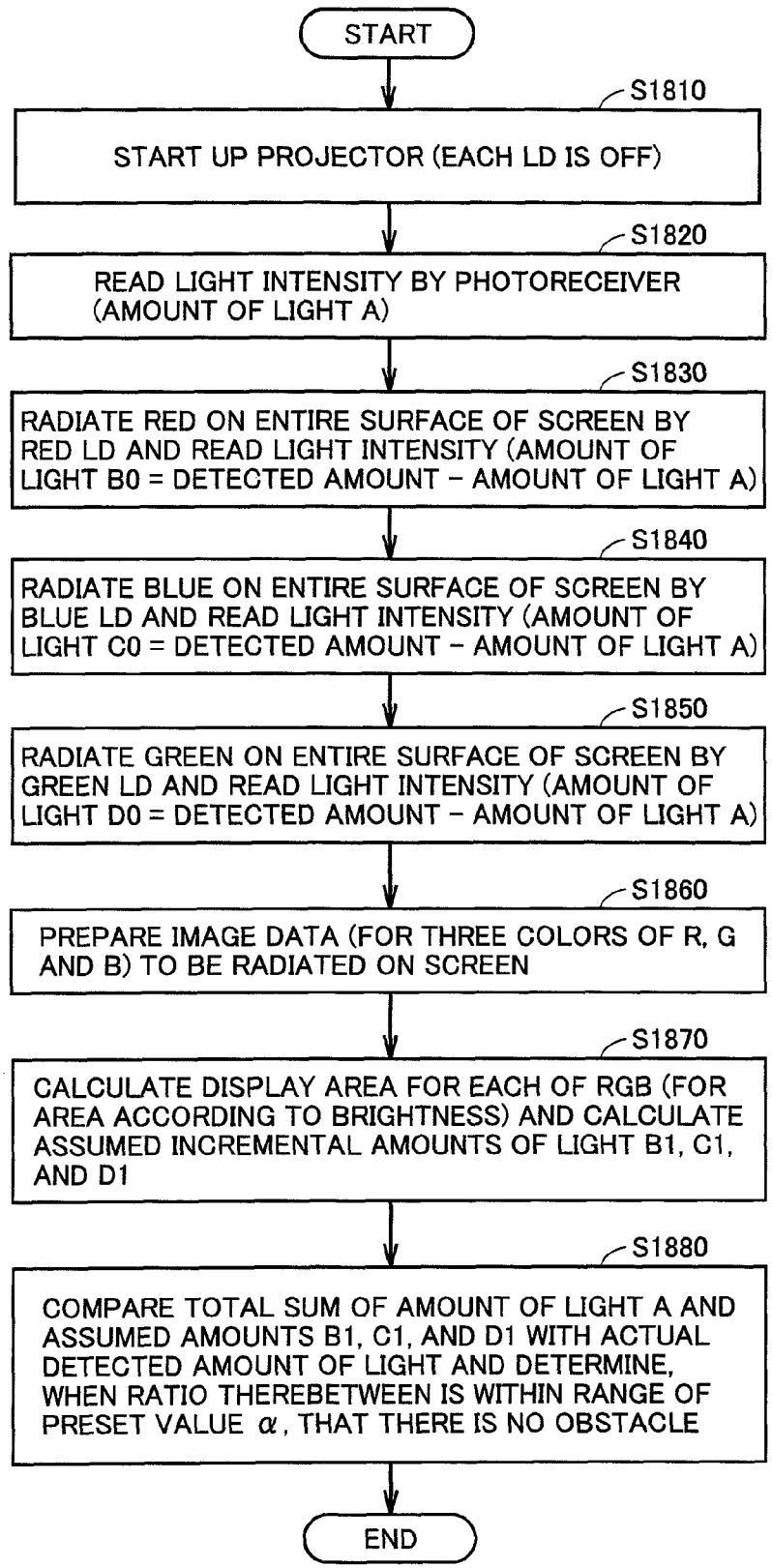
FIG. 11 is a flowchart showing a part of a process performed by a processor.

Now, with reference to FIG. 11, estimation of the amount of the light reception by the projectors according to the embodiments of the present invention will be described. FIG. 11 is a flowchart showing a part of a process performed by a processor included in each projector.

In step S1810, the processor detects start-up of the projector. At this point, the laser diodes (LDs) remain off.

In step S1820, the processor reads, through a photoreceiver, a light reception intensity (amount of light A) obtained before driving the laser diodes. By this, the amount of the light of a projector setup environment before the laser light is radiated is measured.

In step S1830, the processor drives the red laser diode to radiate red laser light on the entire surface of the screen and calculates an amount of light B0 based on the detected amount of the light. In this case, the processor calculates the amount of light B0 using, for example, the equation "amount of light B0=detected amount−amount of light A".

In step S1840, the processor drives the blue laser diode to radiate blue laser light on the entire surface of the screen and calculates an amount of light C0 based on a detected amount of the light. In this case, the processor calculates the amount of light C0 using, for example, the equation "amount of light C0=detected amount−amount of light A".

In step S1850, the processor drives the green laser diode to radiate green laser light on the entire surface of the screen and calculates an amount of light D0 based on the detected amount of the light. In this case, the processor calculates the amount of light D0 using, for example, the equation "amount of light D0=detected amount−amount of light A". Note that the order of steps S1830 to S1850 is not limited to that described above.

In step S1860, the processor prepares image data. More specifically, the processor reads image data (for three colors of R G, and B composing an image) used to show an image on the screen from the non-volatile memory and stores the image data in a work area of a volatile memory.

In step S1870, the processor calculates a display area for each color for the case in which an image is projected for each color, and calculates assumed incremental amounts of light B1, C1, and D1. The calculation of display areas is performed based on the brightnesses of the respective colors composing the image. For example, the processor calculates the assumed incremental amount of light B1 using equation "B1=amount of light B0×display area for red". Also, the processor calculates the assumed incremental amount of light C1 using equation "C1=amount of light C0×display area for blue". The processor calculates the assumed incremental amount of light D1 using equation "D1=amount of light D0×display area for green".

In step S1880, the processor compares the total sum of the amount of light A and the assumed amounts of B1, C1, and D1 with the amount of the light actually detected. Then, if the ratio of the total sum to the detected amount of the light is within the range of a preset value α, then the processor determines that there is no obstacle. In this case, the projector continues radiation of laser lights. On the other hand, if the processor determines that the ratio is not within the range of the preset value, then the processor determines that there is an obstacle. In this case, the processor reduces the output levels of the laser light to a preset level or temporarily stops the laser light output itself.

In the above-described manner, projector 700 according to the second embodiment of the present invention detects the presence of a person on the optical path of the laser light according to the detected amount of light. When the presence of a person is detected, the laser light is suppressed to minimum output (e.g., several lumens). By this, the eyes of a person present near projector 700 can be protected.

A process in FIG. 10 performed by processor 910 includes projection of a white screen onto the entire surface and saving of an amount of light in memory 930 in step S1020. Some screen surfaces may have a color filter effect or may partially have different reflectivities. Therefore, by dividing the process in step S1020, an amount of light may be stored in memory 930 for each color of RGB or the screen may be divided into multiple areas to radiate the laser light on the areas in turn and save amounts of the light in memory 930, whereby determination accuracy can be increased when performing a comparison upon actual projection.

Third Embodiment

Next, a third embodiment of the present invention will be described. An image display apparatus according to the present embodiment is different from the image display apparatuses according to the foregoing embodiments in that the apparatus has a function of suppressing output of the laser light when detecting movement thereof. The movement includes, for example, a change in the location of the image display apparatus, an operation for adjusting the projection direction, or an operation for adjusting the size or shape of a projection surface.

[Hardware Configuration]

Figure 12:
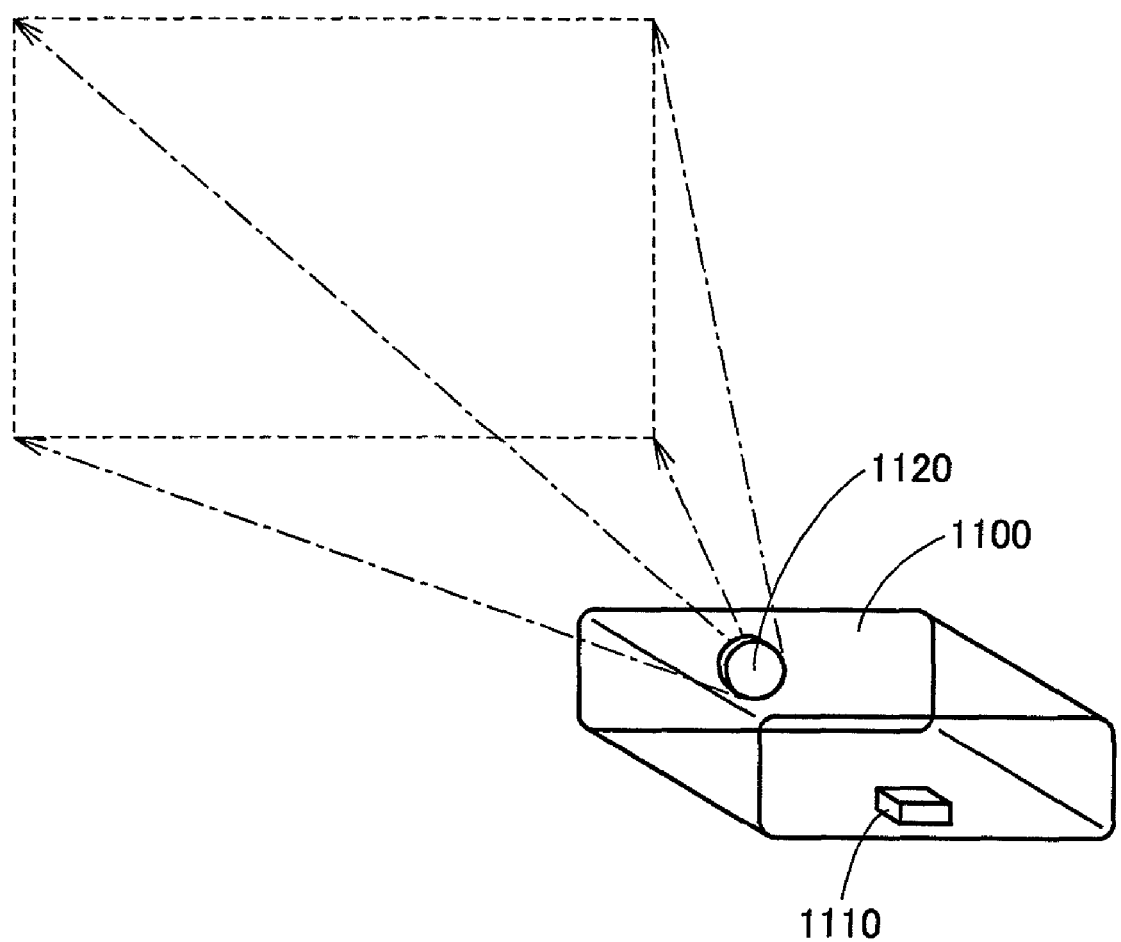
FIG. 12 is a diagram (part 1) schematically showing a configuration of a projector 1100 according to a third embodiment of the present invention.
Figure 13:
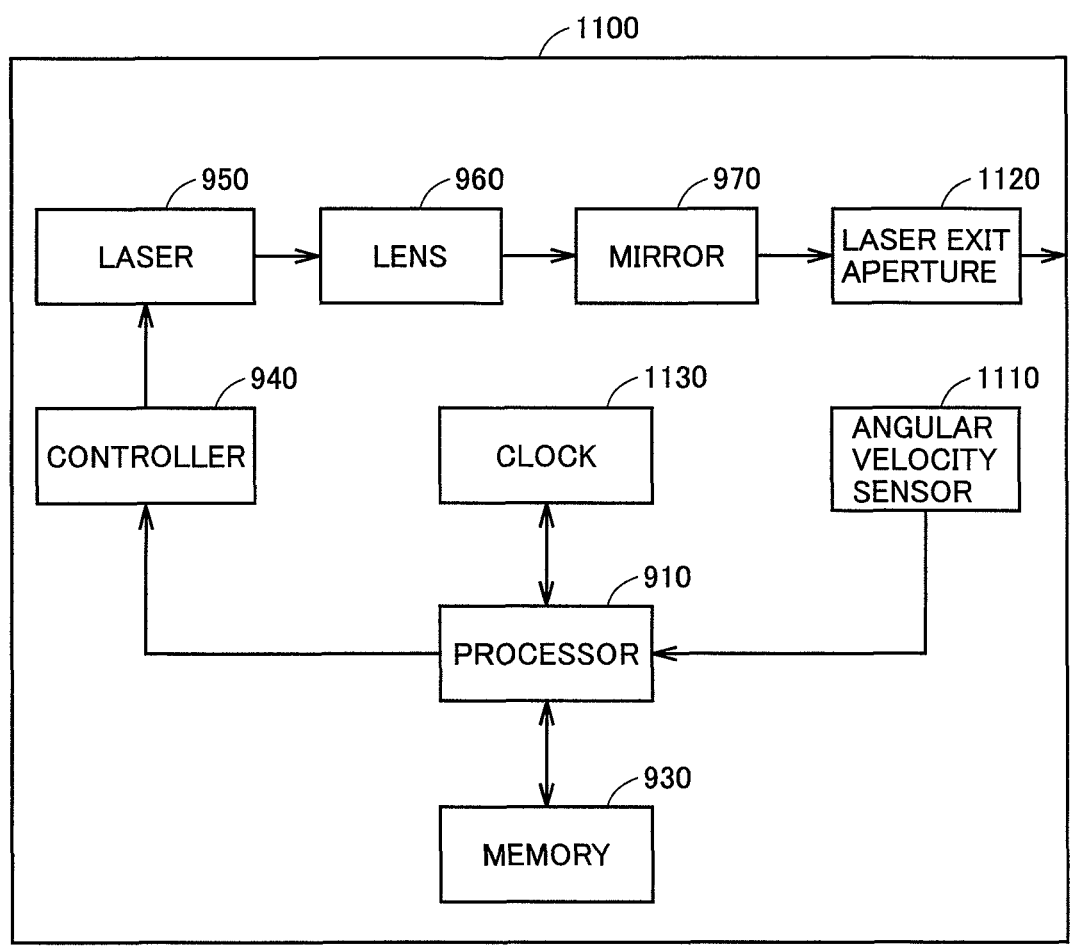
FIG. 13 is a diagram (part 2) schematically showing a configuration of projector 1100.

With reference to FIGS. 12 and 13, a configuration of a projector 1100 which is one mode of the image display apparatus according to the third embodiment of the present invention will be described. FIG. 12 is a diagram schematically showing projector 1100. Projector 1100 includes an angular velocity sensor 1110 and a laser exit aperture 1120.

With reference to FIG. 13, projector 1100 includes a processor 910, a memory 930, a clock 1130, a controller 940, a laser 950, a lens 960, and a mirror 970, in addition to angular velocity sensor 1110 and laser exit aperture 1120.

Angular velocity sensor 1110 detects movement of projector 1100 and sends out a result of the detection to processor 910. Processor 910 controls the operation of projector 1100 according to an output from angular velocity sensor 1110. Clock 1130 measures time in projector 1100. Processor 910 switches the mode of laser light output from laser 950, based on time information sent from clock 1130 and an output from angular velocity sensor 1110.

[Control Structure]

Figure 14:
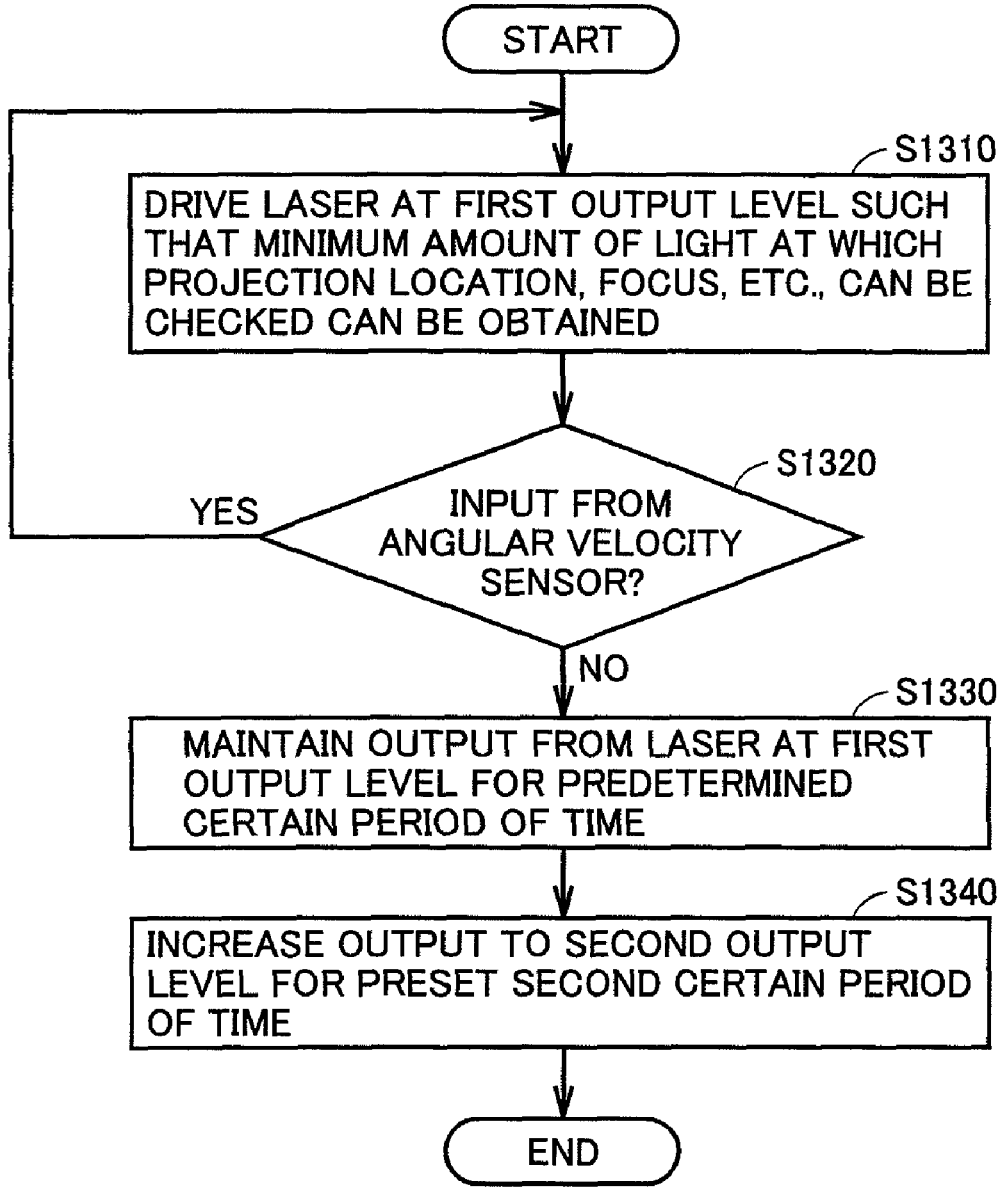
FIG. 14 is a flowchart showing a part of the main operation performed by a processor 910 included in projector 1100 according to the third embodiment of the present invention.

Next, with reference to FIG. 14, a control structure of projector 1100 according to the third embodiment of the present invention will be described. FIG. 14 is a flowchart showing a part of the main operation performed by processor 910.

In step S1310, processor 910 causes laser 950 to output laser light at a pre-specified first output level. The first level is specified, for example, to provide a minimum amount of the light at which a projection location, focus, etc., can be checked.

In step S1320, processor 910 determines whether there has been an input from angular velocity sensor 1110. If processor 910 determines that there has been an input from angular velocity sensor 1110 (YES in step S1320), then processor 910 returns control to step S1310. By this, laser 950 continues the laser light output at the first output level. On the other hand, if processor 910 determines that there has been no input from angular velocity sensor 1110 (NO in step S1320), then processor 910 switches control to step S1330.

In step S1330, processor 910 causes the output from laser 950 to be maintained at the first output level for a predetermined certain period of time, using time information sent from clock 1130.

In step S1340, processor 910 increases the output from laser 950 to a second output level for a preset second certain period of time, based on time data sent from clock 1130.

<Variant>

Figure 15:
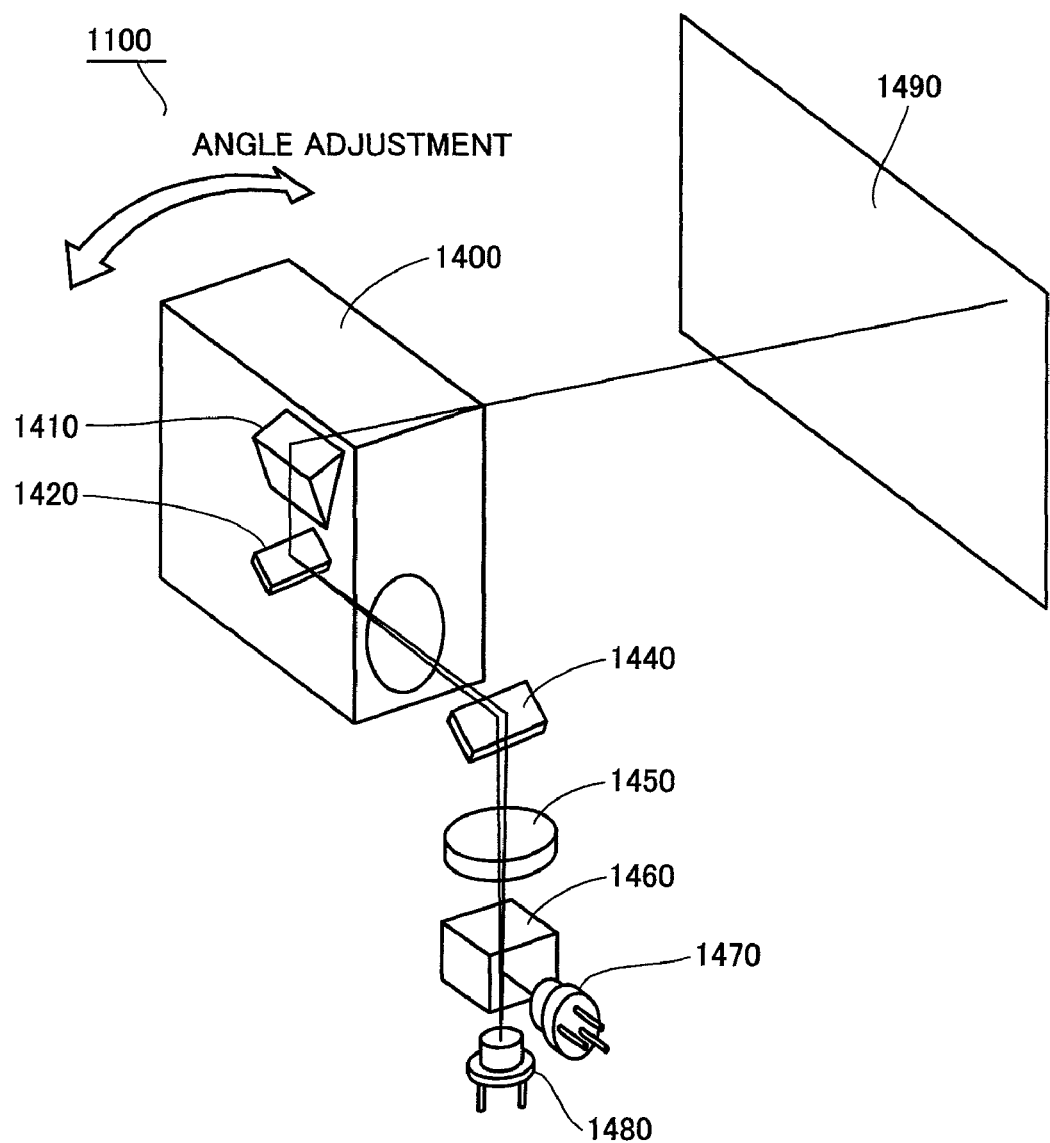
FIG. 15 is a diagram showing a part of a hardware configuration of projector 1100.

With reference to FIG. 15, a detailed configuration of projector 1100 will be described. FIG. 15 is a diagram showing a part of a hardware configuration of projector 1100.

Projector 1100 includes an oscillating unit 1400, a prism 1410, a two-axis galvanometer mirror 1420, a mirror 1440, a collimate lens 1450, a beam splitter 1460, a red/blue laser 1470, and a green laser 1480. Laser light outputted from red/blue laser 1470 and green laser 1480 passes through beam splitter 1460 and collimate lens 1440 and then is reflected by mirror 1440. The reflected light is reflected by two-axis galvanometer mirror 1420. The reflected light passes through prism 1410 and is polarized and outputted.

In such a configuration, oscillating unit 1400 can be operated by a user of projector 1100 to adjust the projection direction of the laser light. Hence, by providing an angle sensor 1110 inside oscillating unit 1400, processor 910 can detect an operation performed by the user.

Fourth Embodiment

A fourth embodiment of the present invention will be described below. An image display apparatus according to the present embodiment has a mechanism for projecting an image onto a screen built in the image display apparatus itself, in addition to a mechanism for projecting an image onto an external screen, as in a normal projector. Such an image display apparatus detects an operation performed by a user and suppresses or temporarily stops the laser light output.

Figure 16:
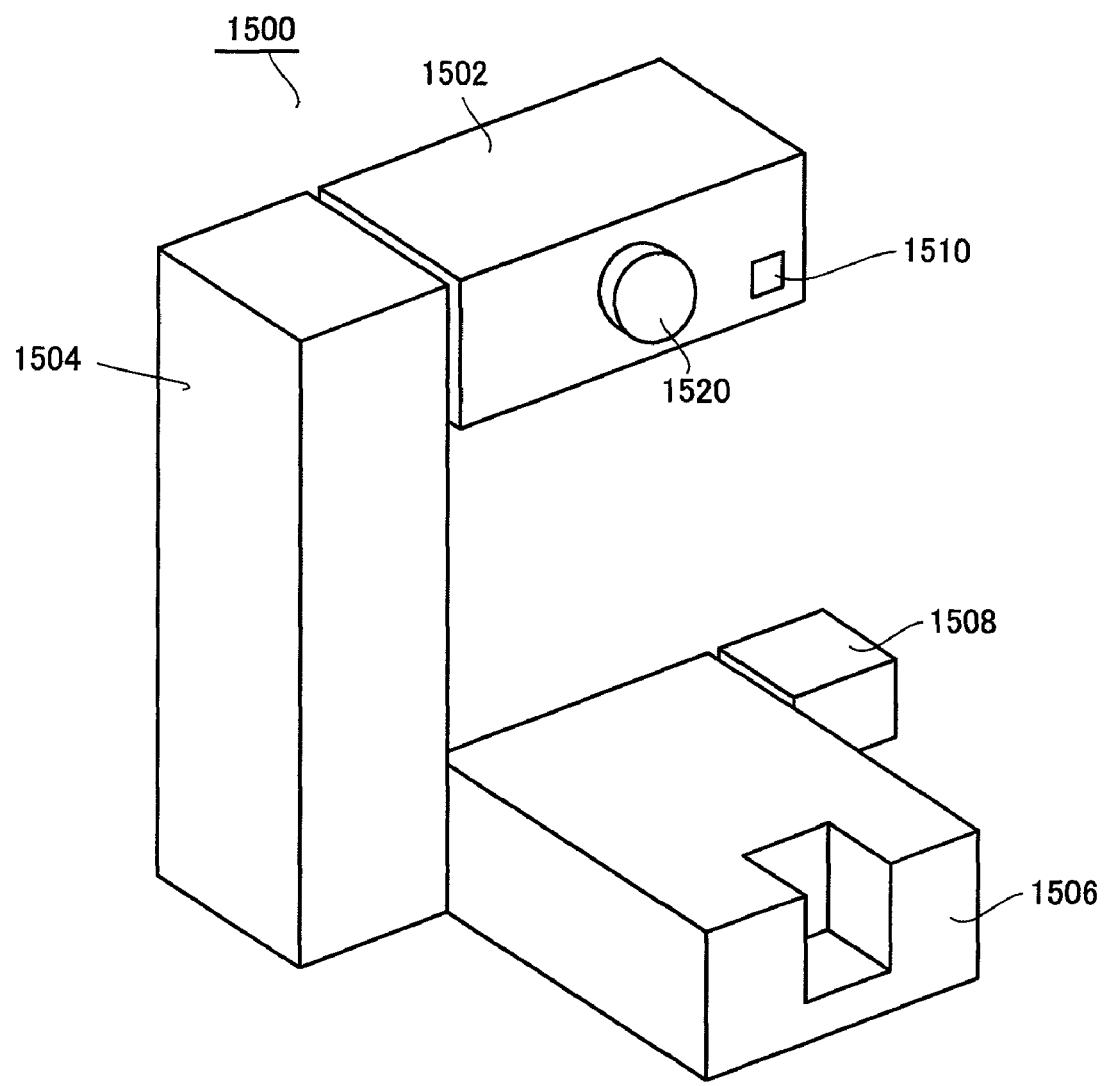
FIG. 16 is a diagram showing a state in which a projector 1500 is set to an externally projectable state.

With reference to FIG. 16, a projector 1500 which is an example of the image display apparatus according to the fourth embodiment of the present invention will be described. FIG. 16 is a diagram showing a state in which projector 1500 is set to an externally projectable state. Projector 1500 includes casings 1502, 1504, 1506, and 1508. Casings 1502, 1504, 1506, and 1508 are configured to be foldable. Projector 1500 includes an angular velocity sensor 1510 and a laser exit aperture 1520.

Casing 1502 is attached to casing 1504 so as to be rotatable about an axis in a longitudinal direction. Similarly, casings 1504 and 1508 are configured so as to be rotatable with respect to casing 1506.

When a user of projector 1500 changes the position of casing 1502 to adjust the projection direction of the laser light, angular velocity sensor 1510 detects the movement of casing 1502. In response to the detection, a processor (not shown) included in projector 1500 suppresses the laser light output to a safe level or temporarily stops the output. By this, the eyes of the user of foldable projector 1500 can be protected.

<Variant>

Figure 17:
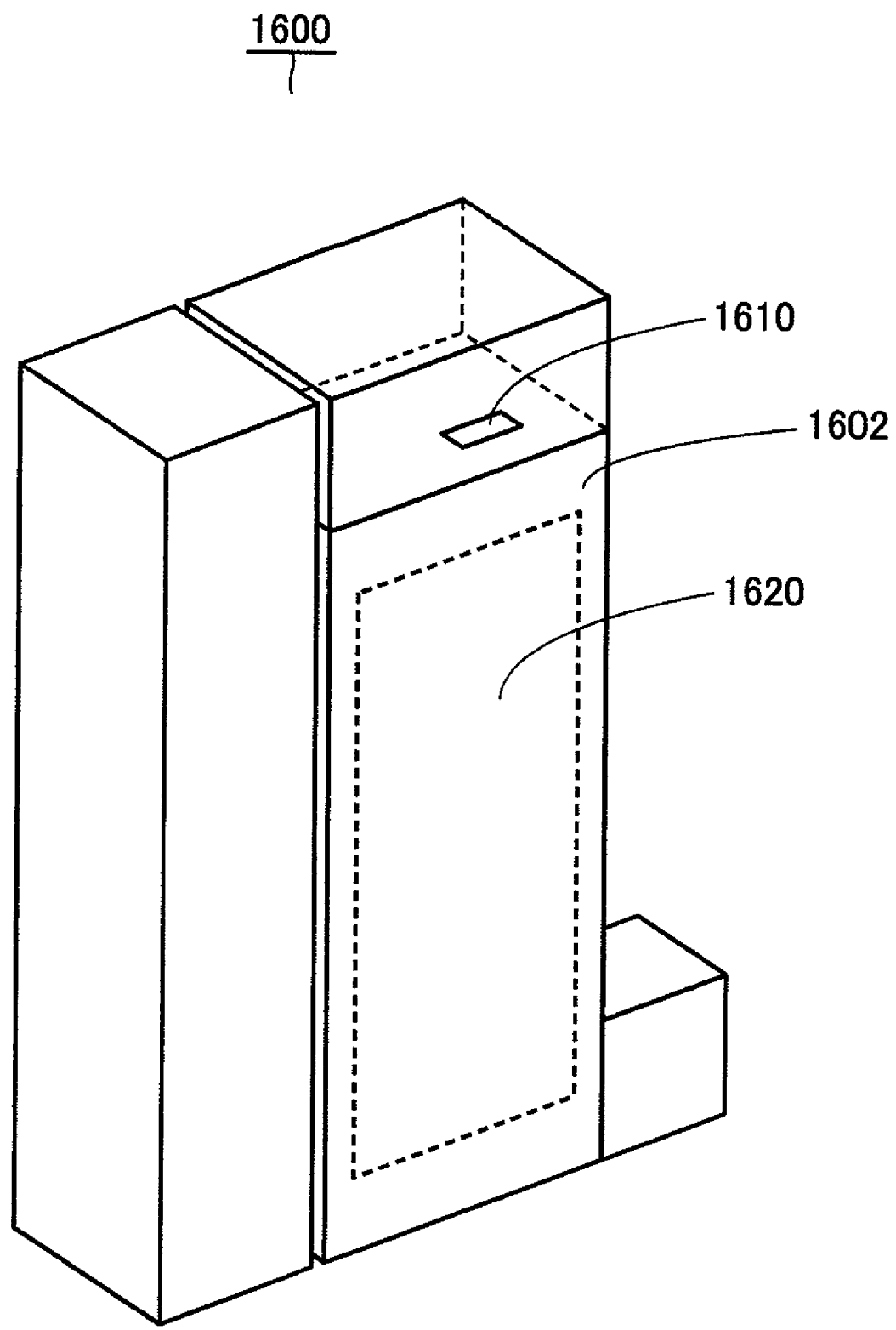
FIG. 17 is a diagram (part 1) showing a state in which a foldable projector 1600 is folded.
Figure 18:
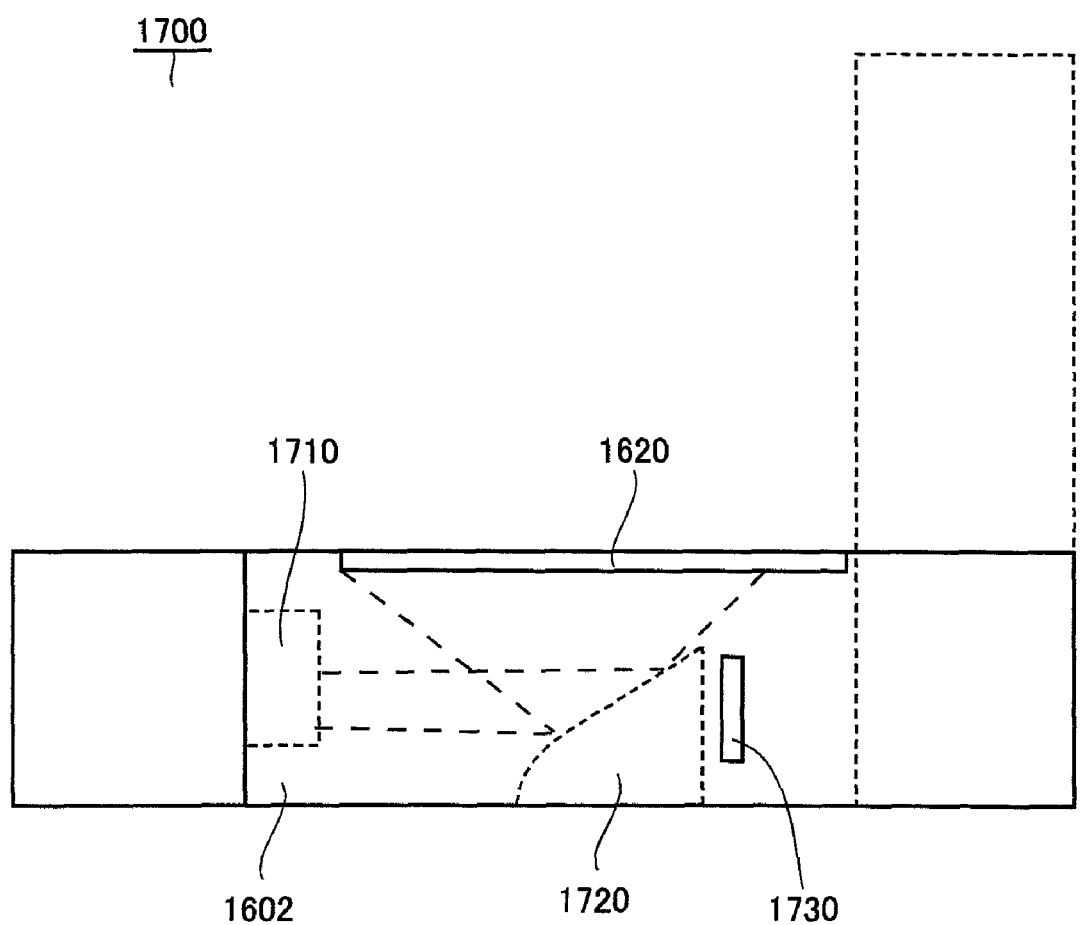
FIG. 18 is a diagram (part 2) showing a state in which foldable projector 1600 is folded.

With reference to FIGS. 17 and 18, a projector 1600 according to a variant of the present embodiment will be described. FIGS. 17 and 18 are diagrams showing a state in which foldable projector 1600 is folded. Projector 1600 has a mechanism for projecting an image onto a screen built in projector 1600, in addition to a mechanism for projecting an image onto an external screen by externally radiating the laser light. The built-in screen is implemented by, for example, using a translucent plastic plate as a material of one surface of a casing.

As shown in FIG. 17, projector 1600 includes an angular velocity sensor 1610 and a screen 1620. Screen 1620 is provided on one surface of a casing 1602. As shown in FIG. 18, projector 1600 further includes a laser exit aperture 1710, a mirror 1720, and a photodetector 1730. Mirror 1720 is implemented as a plane mirror. Alternatively, in another aspect, a surface of mirror 1720 may be curved.

Projector 1600 displays an image on screen 1620 when being folded. More specifically, when projector 1600 is in a state of being properly folded, the laser light coming out of laser exit aperture 1710 is reflected by mirror 1720.

When projector 1600 is in a state in which projector 1600 is properly folded and the laser light does not leak outside, a built-in processor (not shown) determines to project the laser light onto screen 1620. Even when an operator of projector 1600 presses a button to adjust an image size or gives a shake to the casing, whereby the angular velocity sensor 1610 detects the shake, the laser light output is not suppressed or stopped. When projector 1600 is folded, this determination is made based on, for example, the fact that photodetector 1730 does not detect light.

By doing so, while safety in a state in which projector 1600 is open is maintained, the projection of an image in a folded state can be implemented. In addition, when projector 1600 is in a state of being folded and safety thereof is maintained, it becomes unnecessary to suppress or stop the laser light.

In the above-described manner, the projectors according to the embodiments of the present invention temporarily reduce the laser light output levels to a safe level in response to the detection of an operation for adjusting the projection direction of the laser light. Accordingly, the laser light is prevented from entering the eyes of a person present near the projector.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display apparatus comprising:
   a first light-emitting unit configured to emit a first laser light;
   a second light-emitting unit configured to emit a second laser light having a wavelength different from a wavelength of said first laser light;
   a reflecting unit disposed to reflect said first laser light and said second laser light;
   an input unit configured to accept an input performed on said image display apparatus;
   an adjusting unit configured to adjust, based on said input, a projection direction of the light reflected by said reflecting unit or a size or shape of a projection surface; and
   a control unit configured to control amounts of the light emission from said first light-emitting unit and said second light-emitting unit, based on an operation for adjusting said projection direction of the light, wherein
   said adjusting unit includes an optical path adjusting unit configured to make an optical path of said first laser light substantially parallel to an optical path of said second laser light,
   said control unit is configured to control said amounts of the light emission based on drive of said optical path adjusting unit, and
   said optical path adjusting unit includes:
   a lens;
   a beam splitter to split said first laser light and said second laser light transmitted through said lens;
   a hologram element disposed to receive laser light split by said beam splitter; and
   a detector configured to detect the light transmitted through said hologram element.

2. A method for displaying an image comprising:
   emitting a first laser light and a second laser light having a wavelength different from a wavelength of said first laser light;
   adjusting a projection direction of reflected light of said first laser light and said second laser light or a size or shape of a projection surface; and
   controlling amounts of the light emission of a light source of said first laser light and a light source of said second laser light based on an operation for adjusting said projection direction of lights, wherein
   said controlling includes suppressing said amounts of the light emission for a predetermined period of time when an operation for adjusting said projection direction of the light or size or the shape of a projection surface is detected.

3. The method according to claim 2, wherein
said adjusting includes making an optical path of said first laser light substantially parallel to an optical path of said second laser light.

4. The method according to claim 2, wherein
said controlling further includes suppressing said amounts of the light emission from the light source of said first laser light and the light source of said second laser light, to a predetermined amount of the light emission or less.

5. The method according to claim 2, wherein
said controlling further includes controlling the light source of said first laser light and the light source of said second laser light when the completion of an operation for adjusting said projection direction of the light or size or shape of a projection surface is detected, such that said amounts of the light emission become those obtained before performing the adjustment operation.

* * * * *